O. SCHUMANN.
HOT WIRE ELECTRIC MEASURING INSTRUMENT.
APPLICATION FILED MAY 6, 1911.

1,129,126.

Patented Feb. 23, 1915.

WITNESSES
R. C. Braddock.
Emory L. Groff.

INVENTOR—
OSCAR SCHUMANN
By D. P. Wolhaupter
His Attorney.

UNITED STATES PATENT OFFICE.

OSCAR SCHUMANN, OF FRANKFORT-ON-THE-MAIN, GERMANY, ASSIGNOR TO THE FIRM OF HARTMANN & BRAUN, A.-G., OF FRANKFORT-ON-THE-MAIN, GERMANY.

HOT-WIRE ELECTRIC MEASURING INSTRUMENT.

1,129,126.  Specification of Letters Patent.  Patented Feb. 23, 1915.

Application filed May 6, 1911. Serial No. 625,657.

*To all whom it may concern:*

Be it known that I, OSCAR SCHUMANN, a citizen of the German Empire, and residing at Frankfort-on-the-Main, in the Province of Hesse-Nassau and Kingdom of Prussia, Germany, have invented certain new and useful Improvements in Hot-Wire Electric Measuring Instruments, of which the following is a specification.

Hot wire ammeters of the type commonly used are for several reasons unsuitable for high-frequency currents. One of the main reasons of such unsuitability is the necessity of subdividing the hot-wire by means of silver strips forming current loops, the influence of which varies with the frequency of the current. These inconveniences are especially met with in high intensities, where it is not possible to use ordinary shunts; since the ratio of resistance or of conductivity of both materials—wire and shunt—is subject to considerable alterations.

The present invention has for its object to surmount these difficulties by carrying the current intensity through one path or several paths of current arranged rectilineally so as to form no loop whatever. Hitherto wires have been employed of as great length as possible with relation to the size of the instrument box—15 to 20 cm. long; but experience has proved, that such wires are not suitable for the purpose in question. Regarding the inertia of the adjustment, the cross section of the hot-wire should not exceed a certain size about 0.1 mm. square. Owing to the total current passing through the long hot-wires of unshunted instruments, a great heating results, necessitating complicated contrivances for compensating the effects thereof, resulting in the early occurrence of faults in the pointer adjustment.

While the invention is necessarily susceptible of structural modification without departing from the spirit or scope thereof, a preferable and practical form of construction is shown in the accompanying drawings, in which—

Figure 1:
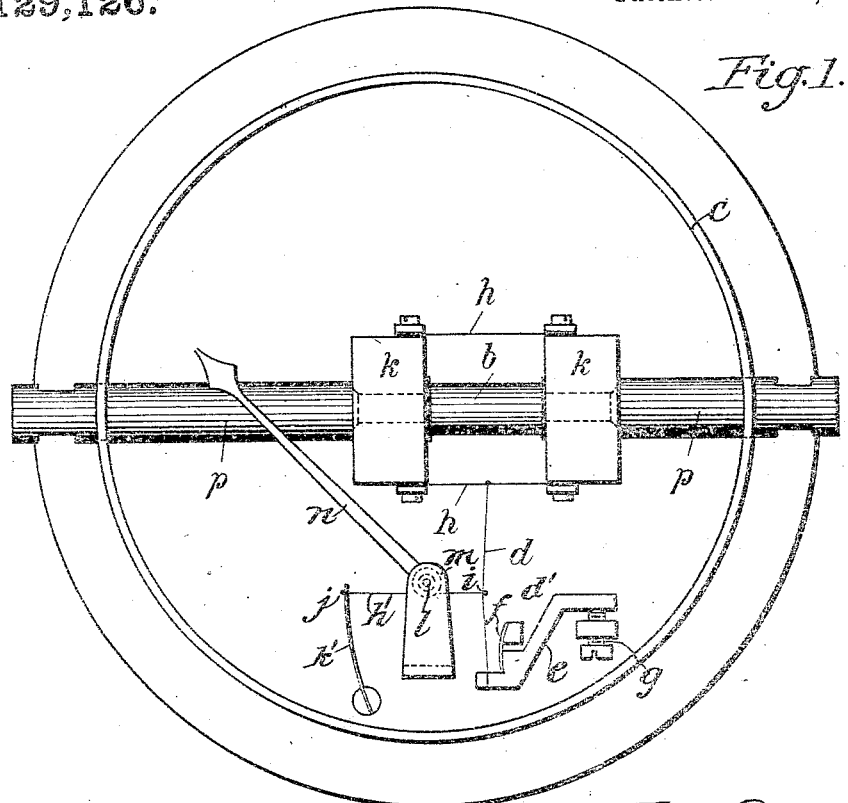
Figure 2:
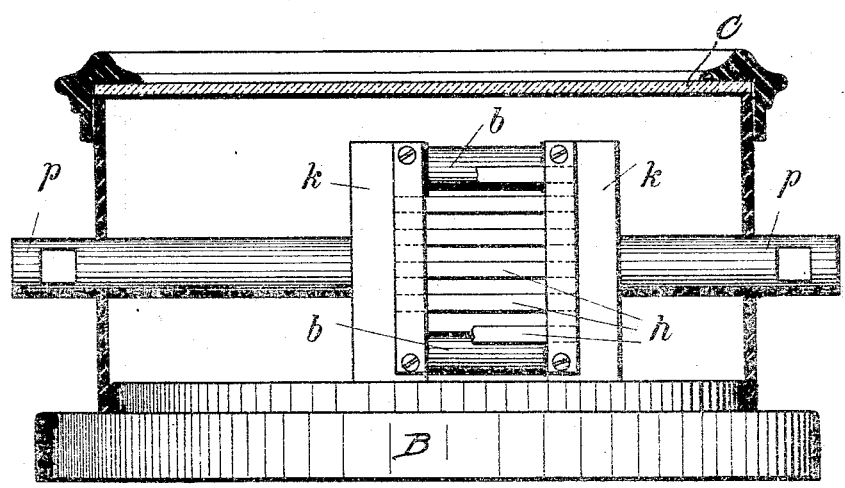

Figure 1 is a top plan view, partly in diagram of a hot-wire ammeter embodying the improvement contemplated by the present invention. Fig. 2 is a vertical cross sectional view of the instrument shown in Fig. 1, the line of section being taken at one side of and excluding the pointer mechanism.

According to the present invention, and contrary to the usual custom, extremely thin ribbons $h$ are used of very short length, say 1-2 inches (2.5-5 cm.) that is only ¼ of that of the measuring wires hitherto used in instruments for usual sizes. By reason, nevertheless, of the considerable heating produced in the ribbon, the elongation of this short piece can be used for the movement of the pointer with sufficient accuracy for technical measurements. The ribbons used are of such trifling thickness, that no change in conductivity can be observed within very wide ranges of low and high frequencies.

The heat produced is indeed of such a character that the hitherto used clamping devices of comparatively small metal masses have not proved suitable, since they were not able to radiate the excessive heat with sufficient rapidity. This inconvenience is obviated by using stout blocks $k$ of good heat-conductivity. These blocks may be either cubical or—if a symmetrical arrangement of the ribbons be preferred—cylindrical: the ribbons being distributed at equal intervals over the cylinder surface. Such blocks offer the further advantage that the clamping device can be made extremely strong and immovable, a requirement which is indispensable with such unusually short wires, as compared with hot-wire instruments of the usual type wherein long wires are used with a relatively small radiation of heat. The cooling effect of the air on the large surfaces of the ribbons and the clamping blocks is of such character that the specific load of current passing through the ribbons can be taken much higher than in ordinary hot-wire instruments hitherto used.

In many cases the compensation of the hot-wires in relation to the external temperature may be dispensed with since, by reason of the great heat produced in the ribbons on the passage of the current, the external temperature may be neglected. Moreover, the problem of devising a compensation which would not prejudicially affect the electrical properties of the system would entail such serious constructional difficulties that the above mentioned solidity of the clamping pieces might be compromised. On the other hand, this solidity may be increased by connecting the clamping blocks with a supporting bridge $b$, the blocks being kept at equal distances from one another. This is the more necessary seeing that the large current conductors entering at $p$, $p$ may occasionally exert a strong distorting influence on the blocks.

It is advisable to form the base plate B to which the blocks are attached of a material which has nearly the same coefficient of expansion as platino-iridium (as preferably used in hot-wire instruments for high frequency currents) as for example marble. Though the employment of marble in connection with hot-wire instruments is already known, it offers in the present case the special advantage of allowing the bridge $b$ to be made of one material solely, (that is to say not of an alloy) preferably iron, which has nearly the same coefficient of expansion as marble. By arranging the bridge $b$, which is of course electrically insulated from the heat-radiating blocks in any conventional manner, distortions of the active system, which, owing to variations of temperature would gradually develop and spread over the whole instrument, are prevented.

As the construction herein described does not provide for compensating any mechanical alteration of the ribbons by adjusting the clamping blocks, the correction of the ribbons is dispensed with and any undesirable variation in length is neutralized by varying the length of the bridge-wire $d$, which is suitably connected with a movable correcting device $d'$, as shown in Fig. 1 of the drawing. This correcting device may be of any approved construction, but for illustrative purposes is shown in the drawings as consisting of an adjustment lever $e$ having a spring or equivalent supporting fulcrum $f$, and to one end of which lever is attached one end of the bridge wire $d$, and the other end of which lever is engaged by an adjusting set screw $g$ having a sufficient delicate adjustment to provide for the necessary correction in the length of the bridge wire whenever such correction is necessary.

Though various forms of connectors may be utilized for connecting the bridge wire with the pointer device, an illustrated form of construction is shown in the drawings as consisting of a flexible connector $h'$, whose terminals are respectively engaged at one end, as at $i$, with the bridge wire $d$, and at its other end as at $j$ with a tension spring $k'$. An intermediate portion of the flexible connector $h$ is coiled about the pointer arbor $l$, as indicated at $m$, said pointer arbor carrying the pointer $n$ which swings over the usual scaled dial (omitted for the sake of clearness).

As already indicated, a distinctive feature of the present invention, which involves a radical and important departure in the art, resides in the employment of a hot-strip or strips (wires or ribbons) possessing the dimensional characteristic of not only being of a very short length, but also exceedingly thin, and to combine such a strip or strips with relatively large heat absorbing or heat radiating blocks of good heat conductivity, as for instance afforded by large blocks of iron. This combination is sharply distinguished from the ordinary hot-wire instruments of the usual type wherein long wires are used with a relatively small radiation of heat, whereas according to the present invention the cooling effect of the air on the large surfaces of the thin ribbons, and on the large surfaces of the clamping blocks, provides an arrangement wherein the specific load of current passing through the hot strip or strips can be taken much higher than in the ordinary hot-wire strips having the usual long hot-wire, with relatively small terminals.

It has already been pointed out that the invention also dispenses with the usual "shunts" which have heretofore been found to be indispensable in any reliable hot-wire instrument having a long hot-wire or strip. According to the present invention, the use of a shunt, with its attendant complications, is entirely avoided, and instead thereof, where the current value requires it, a number of thin strips may be advantageously and conveniently utilized, in parallel, to give the increased capacity for carrying the current, but since each strip or ribbon is alike structurally and functionally it is only necessary to connect the bridge wire with one of such strips or ribbons. In further explanation of this feature of the invention, that is utilizing either a single hot strip or a plurality of such strips, which are usually made of a precious metal, the following dimensional features are to be noted, that is to say, if the service current is of such a value that a single hot strip will not stand it, a plurality of such hot strips is used. These must be extremely thin—about 1/100 mm.—owing to the eddy currents occurring with high frequencies. Besides, they must not be too long lest they are overheated in the center, while the specific load cannot be forced too high. In order to secure the proper bending effect, the strips must be chosen of particular width. For intensities from 2 up to 5 amp. e.g., one strip of some few millimeters width will do, while for larger currents a plurality of such strips must be employed, preferably arranged on a cylinder or block of square section.

A further distinguishing feature of this invention resides in the fact that the novel construction admits of the making of an instrument in a much smaller and compact form than heretofore possible, this being due to the employment of wires or ribbons of relatively small length with respect to the diameter of the instrument casing, and designated by the letter C in the drawings.

From the foregoing, it is thought that the novel features of construction and the important functional results involved will be readily apparent without further description, and it will, of course, be understood that changes in the form, proportion, and minor details of construction as fall within the scope of the appended claims, may be resorted to without departing from the spirit or sacrificing any of the advantages of the invention.

What I claim is:

1. A hot-wire measuring instrument including a casing, a pair of relatively large supporting blocks of good-heat conductivity, and a hot-strip of relatively small length clamped to and extending between said blocks.

2. A hot-wire measuring instrument including a casing, a pair of relatively large supporting blocks of good heat-conductivity, and a hot-strip in the form of a thin ribbon of relatively small length clamped to and extending between said blocks.

3. A hot-wire measuring instrument including a casing having a marble base, a pair of relatively large supporting blocks of good heat-conductivity, and a hot strip of relatively small length clamped to and extending between said blocks.

4. A hot-wire measuring instrument including a casing, a pair of relatively large supporting blocks of good heat-conductivity, a bridge rigidly connecting the said blocks, and a hot strip of relatively small length clamped to and extending between said blocks.

5. A hot-wire measuring instrument including a casing, a pointer device, a pair of relatively large supporting blocks of good heat-conductivity, a hot strip of relatively small length clamped to and extending between said blocks, a bridge wire connecting with the hot strip and also with the pointer device, and an adjustable correcting device connecting with one end of the bridge wire.

6. A hot-wire measuring instrument including a pair of relatively large supporting blocks of good heat-conductivity having wire terminal connections therewith, a series of hot strips of relatively small length arranged in parallel and clamped to and extending between said blocks, and a pointer mechanism including a bridge wire connection with one of the hot strips.

7. A hot-wire measuring instrument including a casing, a pair of relatively large supporting blocks of good heat-conductivity arranged in the casing and having wire terminal connections therewith, said blocks being of circular form, a series of hot strips circularly arranged in parallel about the said blocks and clamped to and extending between the same, the said strips being of relatively small length, and a pointer mechanism connecting with one of the strips.

8. A hot-wire measuring instrument including a casing, a pair of relatively large supporting blocks of good heat-conductivity, a plurality of hot strips clamped to and extending between said blocks, each of said hot strips consisting of a thin ribbon of metal of relatively small length, a pointer mechanism including a bridge wire connection with one of the strips, and an adjustable correcting device connected with one end of the bridge wire.

In testimony whereof I have affixed my signature in presence of two witnesses.

OSCAR SCHUMANN.

Witnesses:
 JEAN GRUND,
 CARL GRUND.